(12) United States Patent
Fishman

(10) Patent No.: US 8,441,343 B1
(45) Date of Patent: May 14, 2013

(54) HANDHELD MOBILE DEVICE VIEWING ANGLE INDICATOR

(76) Inventor: Dean Fishman, Plantation, FL (US)

( * ) Notice: Subject to any disclaimer, the term of this patent is extended or adjusted under 35 U.S.C. 154(b) by 352 days.

(21) Appl. No.: 12/861,472

(22) Filed: Aug. 23, 2010

Related U.S. Application Data

(60) Provisional application No. 61/263,049, filed on Nov. 20, 2009.

(51) Int. Cl.
*G08B 3/10* (2006.01)
*G08B 21/00* (2006.01)
*H04M 1/00* (2006.01)
*H04B 1/38* (2006.01)
*G06F 3/033* (2006.01)
*G06F 3/02* (2006.01)

(52) U.S. Cl.
USPC ............... 340/384.1; 340/689; 455/550.1; 455/566

(58) Field of Classification Search ............ None
See application file for complete search history.

(56) References Cited

U.S. PATENT DOCUMENTS

| 2007/0013651 A1* | 1/2007 | Depue et al. ............. 345/156 |
| 2009/0096910 A1* | 4/2009 | Yasuda et al. ............ 348/333.01 |
| 2010/0259368 A1* | 10/2010 | Fahn .................. 340/384.1 |

* cited by examiner

*Primary Examiner* — George Bugg
*Assistant Examiner* — Renee Dorsey
(74) *Attorney, Agent, or Firm* — Glenn E. Gold; Gold & Rizvi, P.A.

(57) ABSTRACT

A pitch recognition and optimization angle detector is integrated into a portable handheld electronic device, such as a text messaging device, to alert the user of an incorrect pitch to avoid excessive neck strain and potential injury. The pitch detector determines the angle in which the messaging device is currently oriented and compares the angle to an acceptable angle range. The detection system communicates information pertaining to the pitch to the user via either a pitch level indicator or an alert when the device is held outside of the acceptable angle range. The alert can be an icon, a color-coded display, a tactile alert, and an audible alert. The user can select the alert type or types. The acceptable angle range can be a default or user programmable.

21 Claims, 6 Drawing Sheets

HANDHELD MOBILE DEVICE VIEWING ANGLE INDICATOR

RELATED US PATENT APPLICATION

This Non-Provisional US Application claims priority to Provisional U.S. Application 61/263,049, filed Nov. 20, 2009, which is incorporated in its entirety by reference herein.

FIELD OF THE INVENTION

The present disclosure generally relates to an apparatus and method to aid in ensuring proper anatomical use of a handheld mobile device. More particularly, an apparatus and method is provided to indicate (to a device user) whether the device is oriented within a predetermined acceptable angular range, during an operation wherein the user is viewing a device display, to prevent improper/harmiful user anatomical posture.

BACKGROUND OF THE INVENTION

Most mobile device operations require that a user view a device display. For some operations, such as text messaging and e-mailing, repetitive or prolonged viewing is common. As the medical community is learning, such repetitive or prolonged viewing can lead to both temporary and long term harmful health effects. In particular, medical professionals are becoming increasingly aware of the widespread occurrence negative spine related conditions, including cervical spine deformation and related muscle, nerve and joint irritation, due to such prolonged and repetitive viewing. Such issues are particularly prevalent in children, who are spending more and more time using such devices. The problem is not caused by the device operation being performed, but by the user's habitual poor posture (e.g., forward head tilt) while performing texting, emailing and other such operations, with the device.

User interfaces vary from device to device. For example, devices may incorporate alphanumeric keypads, QWERTY keyboards and/or touch displays having a soft key keyboard. Regardless of the type of interface, device users can easily avoid the aforementioned posture issues by simply maintaining the device within a particular orientation while performing data entry operations. Unfortunately, most users fail to recognize when the device is being held at an angle outside of an acceptable range.

Accordingly, the need clearly exists for a way to ensure that portable mobile device users are always cognizant of whether or not they are holding the device in a non-harmful orientation during texting, emailing and other such operations. It would be beneficial to provide such means integrated into the device itself to clearly indicate to a user whether a device is, in fact, being held in manner facilitating good posture.

SUMMARY OF THE INVENTION

The present disclosure is generally directed to a viewing angle reference system and method of use to identify a proper viewing angle for a portable handheld device, alternately referred to herein as a "messaging device."

In some embodiments, the messaging device viewing angle reference system may include:
a messaging device comprising a housing, a display integrated with the housing, messaging software operated by a microprocessor, a user entry means, and a wireless communication system;
an electronic pitch sensor in signal communication with the microprocessor;
pitch monitoring software which identifies when a pitch of the messaging device is outside of an acceptable range; and
a pitch output to communicate the pitch respective to the acceptable pitch range to the user.

In one aspect, the pitch output is a level indicator display.
In one aspect, the level indicator display is displayed as a linear indicator.
In another aspect, the pitch output is an indicator light.
In another aspect, the pitch output is an audio output.
In another aspect, the pitch output is a tactile output.
In another aspect, the pitch output will cause the backlight of the device to dim the screen so that the screen is unreadable.
In another aspect, the acceptable pitch range ranges with a top of the messaging device rotated forward 70 degrees from horizontal to 90 degrees from horizontal.
In another aspect, the acceptable pitch range ranges with a top of the messaging device rotated forward 60 degrees from horizontal to 100 degrees from horizontal.
In another aspect, the acceptable pitch range may be programmable by the device user.
In another aspect, the user may set the type/kind of the pitch output.
In another aspect, the pitch indicator may rotate when the messaging device is rotated to maintain a proper reading orientation.
In another aspect, the pitch indicator may be used for any text entry application, including, for example, text messaging, emailing, note taking, web browsing, document drafting, spreadsheet entry, and the like.
In another aspect, the pitch indicator can be utilized for other tasks such as viewing/reading a display.
In another aspect, a summary or trending of use can be maintained and presented to the user.
In another aspect, the trending of use can be presented in a circular posture trending chart.

These and other aspects, features, and advantages of the present invention will become more readily apparent from the attached drawings and the detailed description of the preferred embodiments, which follow.

BRIEF DESCRIPTION OF THE DRAWINGS

The invention will now be described, by way of example, with reference to the accompanying drawings, where like numerals denote like elements and in which.

Like reference numerals refer to like parts throughout the various views of the drawings.

DETAILED DESCRIPTION OF THE INVENTION

Figure 1:
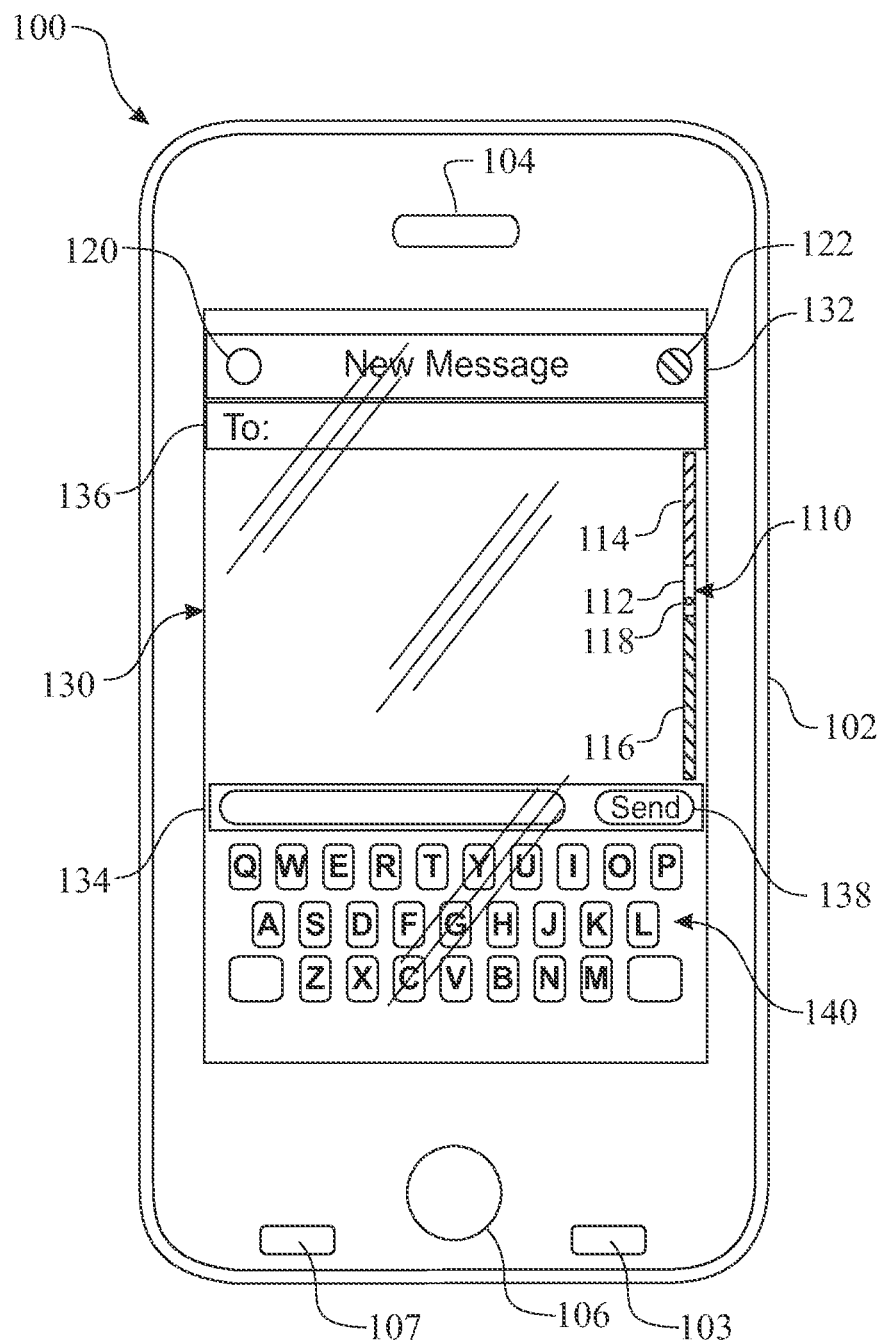
FIG. 1 presents an elevation display view of a handheld mobile device detailing the generic features of an exemplary text messaging user interface.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, where applicable, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

It should be well understood that the present invention could be applied for use with virtually any handheld mobile device. Likewise, it will be well understood that the present invention will benefit device users during a myriad of device operations. However, for the purpose of simplicity, the following description assumes that the device is a text messaging device.

Figure 2:
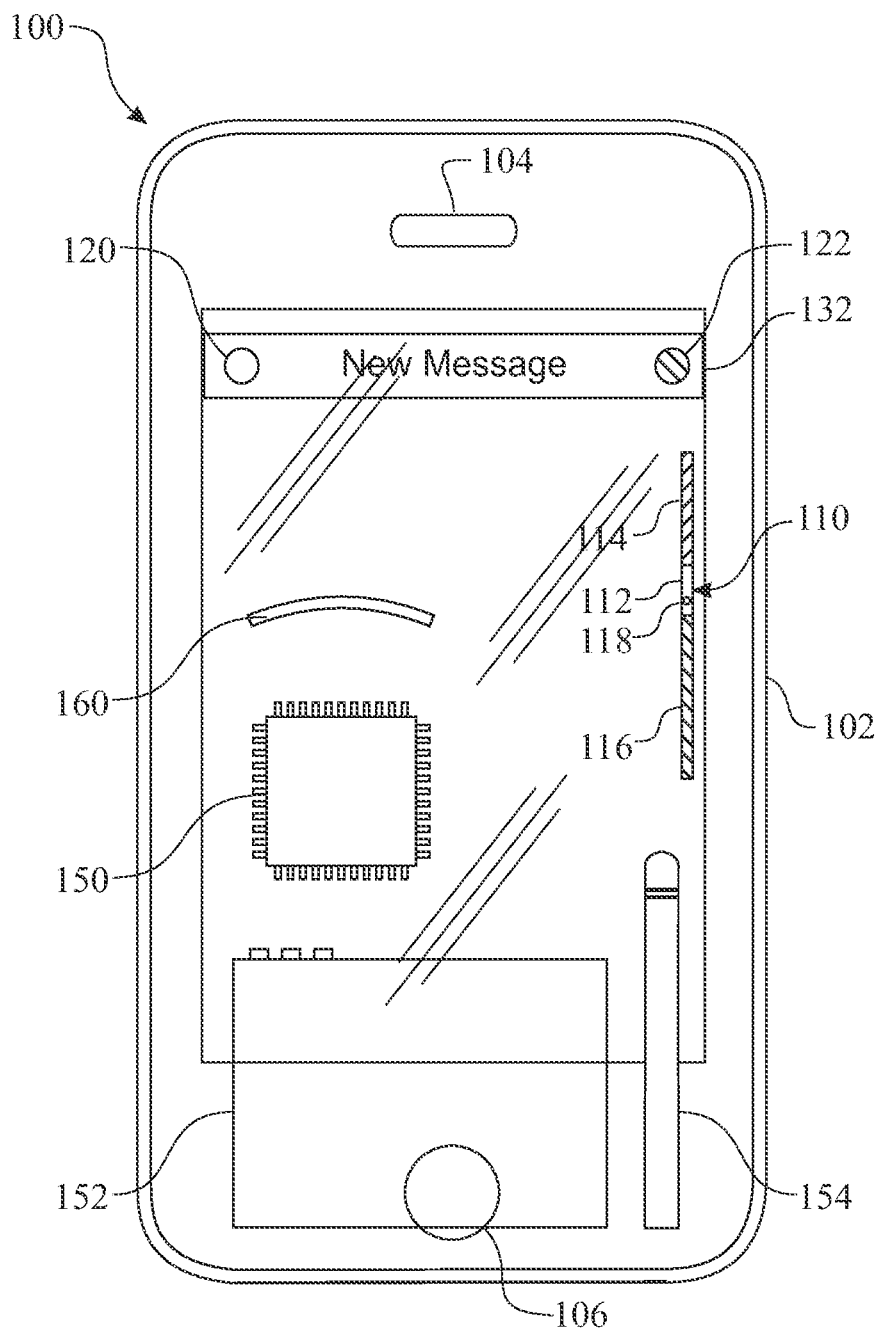
FIG. 2 presents an elevation display view of the device detailing exemplary primary components of a pitch indicating system.

Text messaging device 100 is illustrated throughout the Figures incorporating a pitch indicating system and various pitch indicator outputs. Various generic features of the device 100 are presented in FIG. 1. The device 100 is constructed having a messaging operations window 130 assembled to a messaging device housing 102. The device 100 can include features such as an audio input 103 and an audio low volume output 104 for audio input and output, respectively, as suitable for a cellular telephone. At least one user control interface 106 can be integrated into the device, providing a means for the user to operate the device. The text device 100 may include commonly included components of a messaging system, including a keyboard 140, a messaging operations header 132, a message entry window 134, a messaging address window 136 and a messaging send icon 138. The keyboard 140 can be of any form factor, including soft keys (as shown), an alphanumeric keypad utilized for entry of alphanumeric data, a partial or complete QWERTY hard key keyboard, and the like. The messaging system utilizes software, a microprocessor 150 and respective circuitry, a wireless communications system 154, a portable power supply 152, and the like as illustrated in FIG. 2.

Figure 3:
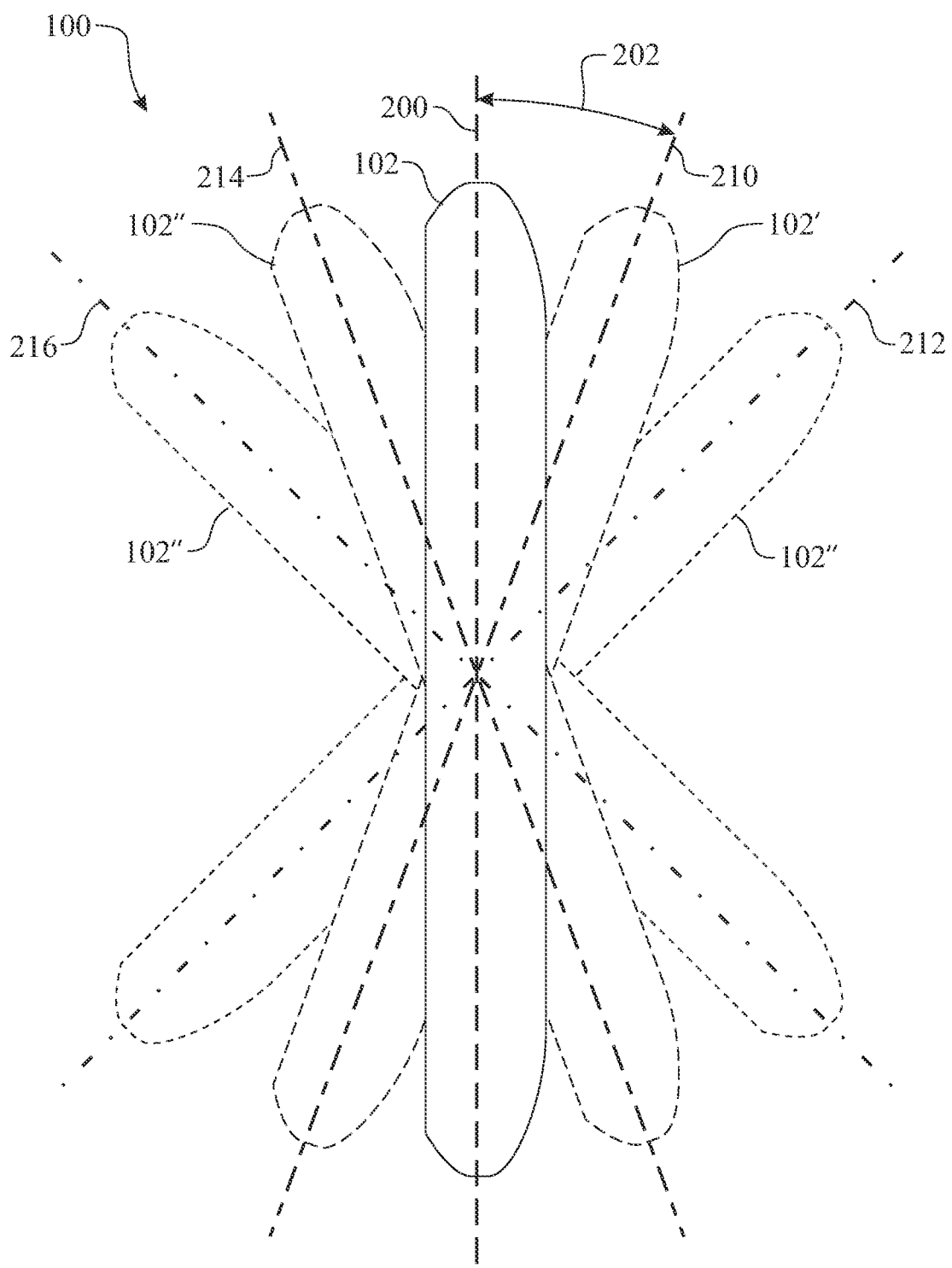
FIG. 3 presents an elevation side view of the device illustrating an acceptable viewing angle.

A pitch indicating system may an electronic pitch sensor 160 in signal communication with the microprocessor 150. Power is provided to the microprocessor 150 and electronic pitch sensor 160 via the portable power supply 152. The electronic pitch sensor 160 monitors the pitch of the text messaging device 100 as illustrated in FIG. 3. The output of the electronic pitch sensor 160 is converted into an understood data point. The data point is interpreted as placing a longitudinal axis of the text messaging device 100 into a pitch angle with the preferred angle being a vertical reference 200 or 90 degrees from horizontal with the display facing the user. The longitudinal axis is defined by the orientation of the messaging device housing 102, being lengthwise when held in a portrait mode (FIGS. 1 and 2) and being widthwise when the messaging device housing 102 is held in a landscape mode (FIG. 5): As the user rolls the text messaging device 100 forward or backward, the pitch changes. The acceptable pitch would be defined by an acceptable pitch range 202 preferably between the vertical reference 200 and an acceptable rearward angle 210. The optimal viewing angle places the housing 102 at a vertical reference 200 about 90 degrees from horizontal, rotated to referenced position illustrated as a messaging device housing 102' wherein the acceptable rearward angle 210 is substantially 70 degrees from horizontal. Should the text messaging device 100 continue to rotate to an angle outside the acceptable pitch range 202, being referenced as positions illustrated as a messaging device housing 102", the system indicates that the pitch is outside of the acceptable pitch range 202. Examples illustrate the text messaging device 100 being outside the acceptable pitch range 202 include being minimally rotated to an unacceptable rearward angle 212, excessively rotated forward to a marginally acceptable forward angle 214, and rotated further to an angle such as an unacceptable forward angle 216. When the text messaging device 100' is rotated to a position within the acceptable pitch range 202, an acceptable pitch indicator 122 would illuminate, and the actual measured pitch indicator 118 would be positioned within the acceptable pitch level section 112. When the text messaging device 100" is rotated beyond the acceptable pitch range 202, such as being tilted excessively rearwards (oriented with the display facing upwards and closer to horizontal), such as an unacceptable rearward angle 212 illustrated in FIG. 3, the actual measured pitch indicator 118 would be positioned within the under limit pitch level section 116. When the text messaging device 100" is rotated beyond the acceptable pitch range 202, such as being tilted excessively forward (display facing downwards and closer to horizontal), such as a marginally acceptable forward angle 214 or worse, a marginally acceptable forward angle unacceptable forward angle 216 as illustrated in FIG. 3, the actual measured pitch indicator 118 would be positioned within the over limit pitch level section 114.

The pitch level indicator 110 is one embodiment for communicating the pitch to a user. Various alternate embodiments can be utilized for communicating the pitch to a user. One such exemplary embodiment utilizes two lighted icons, an unacceptable pitch indicator 120 and an acceptable pitch indicator 122 as shown in the messaging operations header 132. When the text messaging device 100 is positioned within the acceptable pitch range 202, the acceptable pitch indicator 122 illuminates. When the text messaging device 100 is positioned outside the acceptable pitch range 202, the unacceptable pitch indicator 120 illuminates. The unacceptable pitch indicator 120 and acceptable pitch indicator 122 can be color-coded such as green for acceptable, red for unacceptable. It is recognized that a single icon can be used, wherein the icon changes color to indicate an acceptable pitch (green), marginal pitch (yellow), or unacceptable pitch (red). The icon can alternately utilize text, or other identifier.

Figure 4:
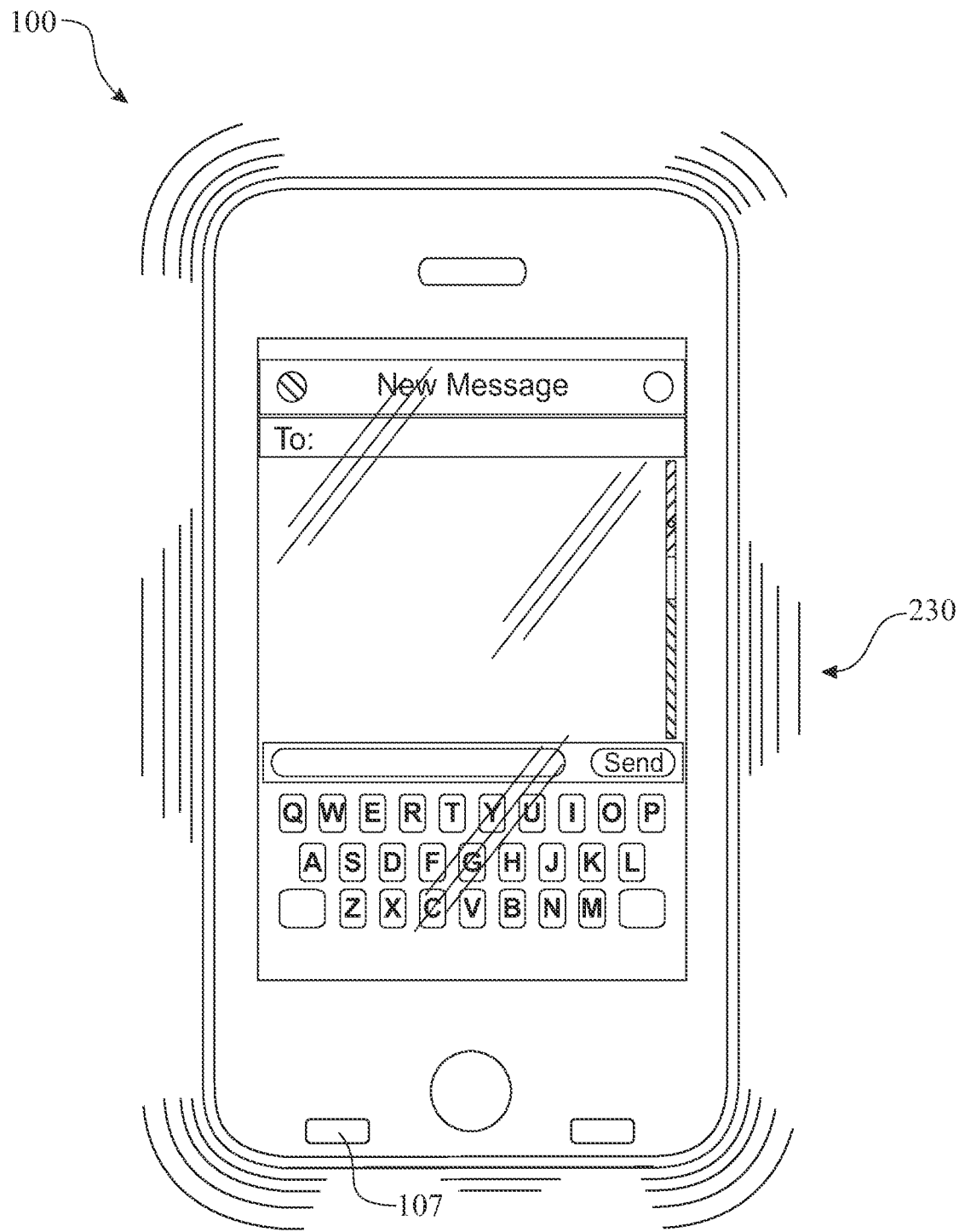
FIG. 4 presents an elevation display view of the device illustrating two additional pitch alerting devices.

Other alternate embodiments are illustrated in FIG. 4, wherein the user is informed that the text messaging device 100 is orientated outside the acceptable pitch range 202 via either a tactile output 230 and/or an audible alert emitted from the audio high volume output 107. The tactile output 230 would be generated by any tactile creation device, such as an off-balanced motor, a pancake motor, and the like. The audio high volume output 107 would provide an audible alert that identifies when the text messaging device 100 is positioned outside the acceptable pitch range 202. The text messaging device 100 can include a plurality of alert notification means (as shown), wherein the alert means can be selected via a software configuration.

Figure 5:
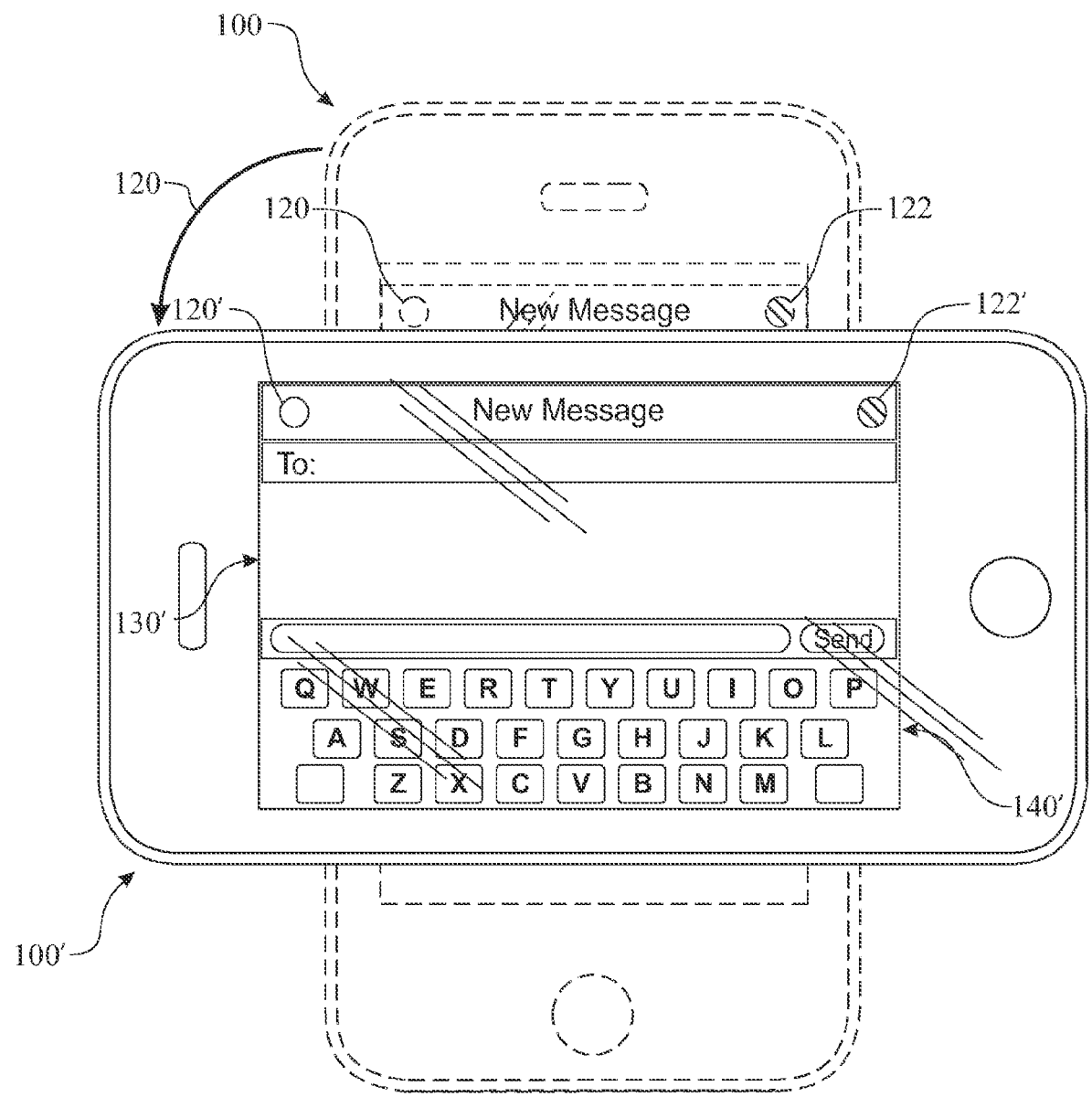
FIG. 5 presents an elevation display view of the device illustrating a rotational messaging user interface.

Any displayed alert, such as the unacceptable pitch indicator 120 and acceptable pitch indicator 122 can be re-oriented if the text messaging device 100 is operable in a rotated orientation presented as a text messaging device 100' illustrated in FIG. 5. The messaging components, such as the messaging operations window 130 and the keyboard 140 (as shown in a portrait view) re-orientate either manually or automatically to a messaging operations window 130' and the keyboard 140'(as shown in a landscape view). The unacceptable pitch indicator 120 and acceptable pitch indicator 122 are also re-orientated and illustrated as an unacceptable pitch indicator 120' and an acceptable pitch indicator 122' respectively. It is recognized the pitch level indicator 110 (FIG. 1) can rotate, change location, change shape, and the like to optimize the view when the text messaging device 100 is rotated to a text messaging device 100' orientation. The software can additionally dim a backlight and/or the display when the a text messaging device 100 is rotated outside of an acceptable angle.

Figure 6:
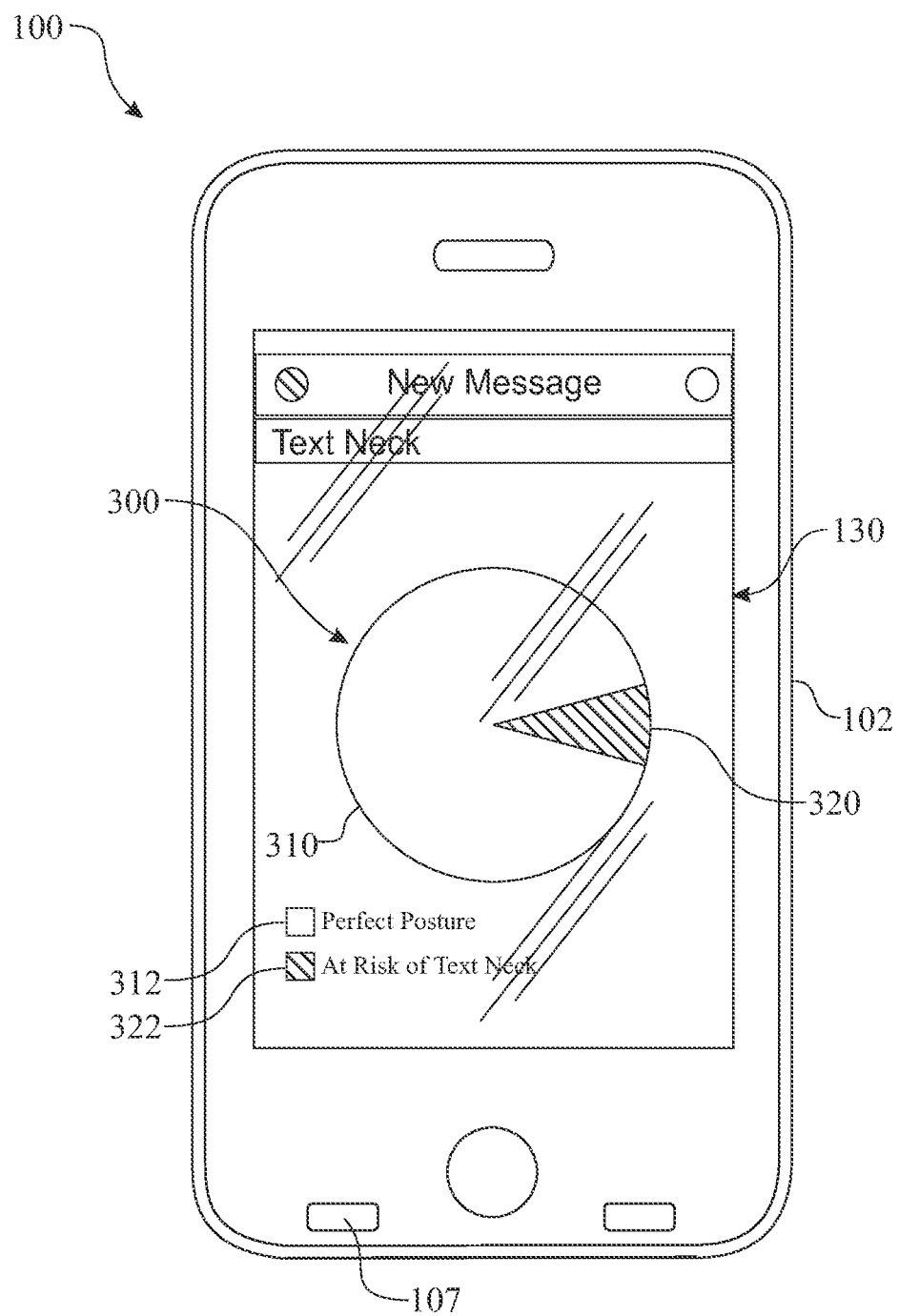
FIG. 6 presents an elevation display view of the device detailing an exemplary trending use pitch indicating system.

Another indicator form factor is referred to as a posture trending reference 300, illustrated in FIG. 6. The posture trending reference 300 displays a tallied data in any format, with the exemplary embodiment illustrated in a form factor of a circular reference, commonly referred to as a pie chart. The application maintains the percentage of use where the text messaging device 100 is positioned outside of the acceptable angle window. The posture trending reference 300 presents a summary of the percentage of time where the user is viewing the text messaging device 100 at an unacceptable angle compared to the total time of usage. The summary can be presented as a ration to the entire usage of time in any format. One exemplary format is a circular reference display 310. A percentage of risk at current viewing angle 320 is presented as a percentage of the circular reference display 310 as illustrated. A reference for the user is presented, including a perfect posture indicator 312 and a at risk usage indicator 322.

It is understood the pitch indicator system is used to ensure the operator maintains proper neck posture, wherein the system can be applied to any user interface, including viewing or reading the display, and any user entry mode, including text messaging (as detailed herein), emailing, note taking, document drafting, spreadsheet data entry, calculators, game playing, and the like.

Although the text messaging device 100 is utilized as an exemplary embodiment in the disclosure, it is understood that the present invention can be integrated into any portable electronics device. Other exemplary devices which can benefit from the present invention include mobile phones, e-readers, portable gaming units, mp3 players, portable computing devices, tablet computing devices, personal data assistants (PDAs), and the like.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A handheld mobile device pitch monitoring method for aiding a device user in properly oriented the device to prevent poor posture while performing an operation, the method comprising the steps:
integrating pitch monitoring software into a handheld electronics device, the handheld electronics device comprising:
a housing including a display, messaging software operated by a microprocessor, user data entry components, and a wireless communication system;
an electronic pitch sensor in signal communication with the microprocessor, wherein the electronic pitch sensor senses a pitch of the handheld device and wherein the electronic pitch sensor produces pitch data output corresponding to the pitch of the handheld device;
receiving pitch data output from the electronic pitch sensor into the microprocessor;
calculating the pitch of the longitudinal axis of the housing with the microprocessor executing instructions of the pitch monitoring software using pitch data output produced by the electronic pitch sensor, wherein the longitudinal axis is the orientation of the housing, being lengthwise when held in a portrait mode and being widthwise when the housing is held in a landscape mode;
determining if the pitch of the longitudinal axis of the housing is one of within or outside of an acceptable pitch range; and
communicating the pitch of the longitudinal axis of the housing respective to the acceptable pitch range, to the user.

2. A handheld mobile device pitch monitoring method as recited in claim 1, the method wherein the step of communicating the pitch of the longitudinal axis of the housing is completed by presenting an output level on a level indicator display.

3. A handheld mobile device pitch monitoring method as recited in claim 2, wherein the level indicator display displays the pitch of the longitudinal axis of the housing along a linear scale.

4. A handheld mobile device pitch monitoring method as recited in claim 1, the method wherein the step of communicating the pitch of the longitudinal axis of the housing is completed by illuminating an indicator light, the indicator light being at least one of:
a. indicating when the handheld electronics device is held at an acceptable pitch, and
b. indicating when the handheld electronics device is held at an unacceptable pitch.

5. A handheld mobile device pitch monitoring method as recited in claim 1, the method wherein the step of communicating the pitch of the longitudinal axis of the housing is completed by generating an audio output, wherein the audio output is generated when the handheld electronics device is held at an unacceptable pitch.

6. A handheld mobile device pitch monitoring method as recited in claim 1, the method wherein the step of communicating the pitch of the longitudinal axis of the housing is completed by generating a tactile event, wherein the tactile event is generated when the handheld electronics device is held at an unacceptable pitch.

7. A handheld mobile device pitch monitoring method for aiding a device user in properly oriented the device to prevent poor posture while performing an operation, the method comprising the steps:
integrating pitch monitoring software into a handheld electronics device, the handheld electronics device comprising:
a housing including a display, messaging software operated by a microprocessor, user data entry components, and a wireless communication system;

an electronic pitch sensor in signal communication with the microprocessor, wherein the electronic pitch sensor senses a pitch of the handheld device and wherein the electronic pitch sensor produces pitch data output corresponding to the pitch of the handheld device;

receiving pitch data output from the electronic pitch sensor into the microprocessor;

calculating the pitch of the longitudinal axis of the housing with the microprocessor executing instructions of the pitch monitoring software using pitch data output produced by the electronic pitch sensor, wherein the longitudinal axis is the orientation of the housing, being lengthwise when held in a portrait mode and being widthwise when the housing is held in a landscape mode;

determining if the pitch of the longitudinal axis of the housing is one of within or outside of an acceptable pitch range, wherein the acceptable pitch range is established as a range having range set points equal to or within a setting where a top of the handheld electronics device is rotated forward between 60 degrees from horizontal and 100 degrees from horizontal; and communicating the pitch of the longitudinal axis of the housing respective to the acceptable pitch range, to the user.

8. A handheld mobile device pitch monitoring method as recited in claim 7, the method wherein the step of communicating the pitch of the longitudinal axis of the housing is completed by presenting an output level on a level indicator display.

9. A handheld mobile device pitch monitoring method as recited in claim 8, wherein the level indicator display displays the pitch of the longitudinal axis of the housing along a linear scale.

10. A handheld mobile device pitch monitoring method as recited in claim 7, the method wherein the step of communicating the pitch of the longitudinal axis of the housing is completed by illuminating an indicator light, the indicator light being at least one of:
   a. indicating when the handheld electronics device is held at an acceptable pitch, and
   b. indicating when the handheld electronics device is held at an unacceptable pitch.

11. A handheld mobile device pitch monitoring method as recited in claim 7, the method wherein the step of communicating the pitch of the longitudinal axis of the housing is completed by generating an audio output, wherein the audio output is generated when the handheld electronics device is held at an unacceptable pitch.

12. A handheld mobile device pitch monitoring method as recited in claim 7, the method wherein the step of communicating the pitch of the longitudinal axis of the housing is completed by generating a tactile event, wherein the tactile event is generated when the handheld electronics device is held at an unacceptable pitch.

13. A handheld mobile device pitch monitoring method as recited in claim 7, wherein the step of determining if the pitch of the longitudinal axis of the housing is one of within or outside of an acceptable pitch range, utilizes an acceptable pitch range having an established a range with range set points equal to or between where a top of the handheld electronics device is rotated forward between 70 degrees from horizontal and 100 degrees from horizontal.

14. A handheld mobile device pitch monitoring method as recited in claim 7, wherein the step of determining if the pitch of the longitudinal axis of the housing is one of within or outside of an acceptable pitch range, utilizes an acceptable pitch range having an established a range with range set points equal to or between where a top of the handheld electronics device is rotated forward between 70 degrees from horizontal and 90 degrees from horizontal.

15. A handheld mobile device pitch monitoring method as recited in claim 7, wherein the step of determining if the pitch of the longitudinal axis of the housing is one of within or outside of an acceptable pitch range, utilizes an acceptable pitch range having a range where a top of the handheld electronics device is rotated forward between 70 degrees from horizontal and 90 degrees from horizontal.

16. A handheld mobile device pitch monitoring method for aiding a device user in properly oriented the device to prevent poor posture while performing an operation, the method comprising the steps:

integrating pitch monitoring software into a handheld electronics device, the handheld electronics device comprising:
   a housing including a display, messaging software operated by a microprocessor, user data entry components, and a wireless communication system;
   an electronic pitch sensor in signal communication with the microprocessor, wherein the electronic pitch sensor senses a pitch of the handheld device and wherein the electronic pitch sensor produces pitch data output corresponding to the pitch of the handheld device;

receiving pitch data output from the electronic pitch sensor into the microprocessor;

calculating the pitch of the longitudinal axis of the housing with the microprocessor executing instructions of the pitch monitoring software using pitch data output produced by the electronic pitch sensor, wherein the longitudinal axis is the orientation of the housing, being lengthwise when held in a portrait mode and being widthwise when the housing is held in a landscape mode;

determining if the pitch of the longitudinal axis of the housing is one of within or outside of an acceptable pitch range; and communicating the pitch of the longitudinal axis of the housing respective to the acceptable pitch range, to the user, wherein the step of communicating the pitch of the longitudinal axis of the housing is completed by at least two distinct methods.

17. A handheld mobile device pitch monitoring method as recited in claim 16, the method wherein the step of communicating the pitch of the longitudinal axis of the housing is completed by presenting an output level on a level indicator display.

18. A handheld mobile device pitch monitoring method as recited in claim 17, wherein the level indicator display displays the pitch of the longitudinal axis of the housing along a linear scale.

19. A handheld mobile device pitch monitoring method as recited in claim 16, the method wherein the step of communicating the pitch of the longitudinal axis of the housing is completed by illuminating an indicator light, the indicator light being at least one of:
   c. indicating when the handheld electronics device is held at an acceptable pitch, and
   d. indicating when the handheld electronics device is held at an unacceptable pitch.

20. A handheld mobile device pitch monitoring method as recited in claim 16, the method wherein the step of communicating the pitch of the longitudinal axis of the housing is completed by generating an audio output, wherein the audio output is generated when the handheld electronics device is held at an unacceptable pitch.

21. A handheld mobile device pitch monitoring method as recited in claim 16, the method wherein the step of communicating the pitch of the longitudinal axis of the housing is completed by generating a tactile event, wherein the tactile event is generated when the handheld electronics device is held at an unacceptable pitch.

* * * * *